United States Patent
Kessler et al.

(10) Patent No.: US 11,812,912 B2
(45) Date of Patent: Nov. 14, 2023

(54) METHOD FOR THE DOSING OF CLEANING AGENTS

(71) Applicant: Henkel AG & Co. KGaA, Duesseldorf (DE)

(72) Inventors: Arnd Kessler, Monheim am Rhein (DE); Thomas Weber, Weimar (DE); Johannes Zipfel, Amsterdam (NL); Christian Nitsch, Duesseldorf (DE); Lars Zuechner, Langenfeld (DE); Nadine Franke, Cologne (DE); Georg Wawer, Vienna (AT); Alexander Mueller, Monheim (DE); Clemens Arth, Graz (AT)

(73) Assignee: HENKEL AG & CO. KGAA, Duesseldorf (DE)

( * ) Notice: Subject to any disclaimer, the term of this patent is extended or adjusted under 35 U.S.C. 154(b) by 0 days.

(21) Appl. No.: 16/469,572

(22) PCT Filed: Dec. 7, 2017

(86) PCT No.: PCT/EP2017/081857
§ 371 (c)(1),
(2) Date: Jun. 13, 2019

(87) PCT Pub. No.: WO2018/114363
PCT Pub. Date: Jun. 28, 2018

(65) Prior Publication Data
US 2020/0113405 A1    Apr. 16, 2020

(30) Foreign Application Priority Data
Dec. 21, 2016    (DE) ............... 10 2016 225 833.8

(51) Int. Cl.
*A47L 15/00*    (2006.01)
*A47L 15/44*    (2006.01)
(Continued)

(52) U.S. Cl.
CPC ......... *A47L 15/0055* (2013.01); *A47L 15/006* (2013.01); *A47L 15/0063* (2013.01);
(Continued)

(58) Field of Classification Search
CPC ............... A47L 15/006; A47L 15/0055; A47L 15/0063; A47L 15/4445; A47L 15/4463;
(Continued)

(56) References Cited

U.S. PATENT DOCUMENTS 7,571,734 B2 *    8/2009    Kappler ............. A47L 15/4257
                                                        134/94.1
8,845,818 B2    9/2014    Lonski
(Continued)

FOREIGN PATENT DOCUMENTS

CN    101052340 A    10/2007
CN    101437436 A    5/2009
(Continued)

OTHER PUBLICATIONS

EPO, International Search Report and Written Opinion issued in International Application No. PCT/EP2017/081857, dated Apr. 12, 2018.

*Primary Examiner* — Douglas Lee
(74) *Attorney, Agent, or Firm* — Lorenz & Kopf, LLP

(57) ABSTRACT

A method for the dosing of cleaning agents in cleaning machines, including the steps: receiving control information items, wherein the control information items are dependent on information about a cleaning machine; determining the progress of a cleaning operation; dosing of cleaning agent depending on the received control information items and the determined progress of the cleaning operation; wherein the information about the cleaning machine can be determined via a sensor-based automatic recognition.

10 Claims, 6 Drawing Sheets

(51) Int. Cl.
    *D06F 39/02*     (2006.01)
    *D06F 33/37*     (2020.01)

(52) U.S. Cl.
    CPC ....... *A47L 15/4445* (2013.01); *A47L 15/4463* (2013.01); *D06F 33/37* (2020.02); *D06F 39/024* (2013.01); *A47L 2401/03* (2013.01); *A47L 2401/34* (2013.01); *A47L 2501/07* (2013.01); *G06V 2201/09* (2022.01)

(58) Field of Classification Search
    CPC ............. A47L 2301/08; A47L 2401/03; A47L 2401/10; A47L 2401/11; A47L 2401/30; A47L 2401/34; A47L 2501/07; A47L 2501/26; D06F 39/024; G06K 9/00; G06K 2209/01; G06K 2209/25; G06K 9/2054; G06K 9/36
    See application file for complete search history.

(56) References Cited

U.S. PATENT DOCUMENTS

| | | | | |
|---|---|---|---|---|
| 9,349,297 | B1* | 5/2016 | Ortiz | G06V 10/761 |
| 2003/0182732 | A1* | 10/2003 | Davenet | D06F 34/22 |
| | | | | 8/158 |
| 2005/0196046 | A1* | 9/2005 | Hudnut | A47L 15/4293 |
| | | | | 382/218 |
| 2011/0114716 | A1* | 5/2011 | Pratt | H04L 12/282 |
| | | | | 382/229 |
| 2011/0180118 | A1 | 7/2011 | Schrott | |
| 2011/0226808 | A1* | 9/2011 | Lonski | D06F 39/02 |
| | | | | 222/173 |
| 2012/0138092 | A1* | 6/2012 | Ashrafzadeh | A47L 15/4295 |
| | | | | 134/57 D |
| 2012/0247158 | A1 | 10/2012 | Ditze et al. | |
| 2013/0073690 | A1* | 3/2013 | DeSalvo | H04L 67/12 |
| | | | | 709/219 |
| 2014/0236328 | A1* | 8/2014 | Kamon | D06F 33/37 |
| | | | | 700/90 |
| 2016/0218884 | A1* | 7/2016 | Ebrom | H04L 12/2816 |

FOREIGN PATENT DOCUMENTS

| | | |
|---|---|---|
| CN | 101448996 A | 6/2009 |
| DE | 102006038341 A1 | 2/2008 |
| DE | 102008027280 A1 | 5/2009 |
| DE | 102008036586 A1 | 2/2010 |
| DE | 102008053312 A1 | 4/2010 |
| DE | 102009045580 A1 | 4/2011 |
| EP | 2789725 A1 | 10/2014 |
| EP | 3150757 A1 | 4/2017 |
| KR | 20150086807 A | 7/2015 |
| WO | 2008019902 A1 | 2/2008 |

* cited by examiner

| Ser. No. | Con. Inf. | Maunfa. | Image |
|---|---|---|---|
| 3220-1114 |  | A |  |
| 7260-7714 |  | A |  |
| 4520-2234 |  | B |  |

METHOD FOR THE DOSING OF CLEANING AGENTS

CROSS-REFERENCE TO RELATED APPLICATION

This application is a U.S. National-Stage entry under 35 U.S.C. § 371 based on International Application No. PCT/EP2017/081857, filed Dec. 7, 2017, which was published under PCT Article 21(2) and which claims priority to German Application No. 10 2016 225 833.8, filed Dec. 21, 2016, which are all hereby incorporated in their entirety by reference.

TECHNICAL FIELD

The present disclosure relates to a method and a device for the automatic dosing of cleaning agents in a cleaning machine.

BACKGROUND

One known problem in cleaning with the aid of cleaning machines relates to the dosing of the cleaning agents used, such as with regard to the optimal time of delivery of the cleaning substance and the optimum amount. In this case, too low, as well as too high a dosage of cleaning agents leads to an unsatisfactory cleaning result. Unnecessarily high amounts of energy, cleaning agents and water are consumed in the case of too high a dosage, which not only increases the cost, but also additionally burdens the environment.

However, an accurate dosage of the cleaning agent is not trivial, since the correct dosage not only depends on the amount and degree of soiling of the objects to be cleaned, but also by other factors, such as the selected cleaning program, the type of soiling, the water hardness, the cleaning agent and any cleaning additives and the like.

To solve the problems mentioned, cleaning machines having automatic dosing systems are known in which, with the aid of a variety of sensors, a current cleaning state of items to be cleaned and a current operating state of a cleaning machine are identified and, depending on the determined states, dosed cleaning agent is delivered to the cleaning machines, so that a single cleaning operation for example includes a plurality of dosing operations.

However, because automatic dosing is also desired in cleaning operations using older cleaning machines, which generally have a service life of from about 15 to about 20 years, a universally applicable retrofit system, such as a universally applicable mobile automatic dosing device has been proposed, in which dosed cleaning agent is also delivered to the cleaning machines depending on current cleaning states of the items to be cleaned and depending on determined current operating states of the cleaning machines.

A disadvantage of the proposed mobile automatic dosing device, however, is that this, such as in ensuring the desired universal applicability, can only inaccurately determine an optimal time for the dosing of cleaning agent during a cleaning operation, being based only on data determined during a cleaning operation data, which finally leads to an optimal cleaning result not being able to be achieved. Such as, the accurate determination of the current operating states of a cleaning machine solely on the basis of data determined during a cleaning operation data is problematic in this case.

BRIEF SUMMARY

Against this background, it is thus an object to at least partially reduce or avoid the problems described, that is, to provide an optimum cleaning result with low consumption of energy, water and cleaning agent with the most universal applicability of the mobile dosing device.

This object is solved objectively by a method for the automatic dosing of cleaning agents according to claim 1.

It has been recognized that an optimal time for the dosing of cleaning agent during a cleaning operation can be determined very accurately in which, in addition to a current cleaning state of the items to be cleaned, a current operating state of a cleaning machine is also known.

Furthermore, it has been recognized that the operating state of a cleaning machine and thus with knowledge of a current cleaning state, the optimal time for a dosing of cleaning agent can also be determined very accurately, in which the dosing device receives control information items concerning the cleaning machine performing the cleaning operation before the beginning of a cleaning operation.

Against the background of the greatest possible user-friendliness, it is considered particularly advantageous when the operation which leads to the receipt of the control information item is carried out largely automatically.

According to a first aspect, therefore, a method for the dosing of cleaning agents in cleaning machines is proposed, including the steps: receiving control information items, wherein the control information items are dependent on information about a cleaning machine; determining the progress of a cleaning operation; dosing of cleaning agent depending on the received control information items and the determined progress of the cleaning operation; wherein the information about the cleaning machine can be determined via a sensor-based automatic recognition.

Cleaning agents are objectively understood as meaning not only laundry cleaning agents but also, such as, fabric softeners, machine cleaners, dishwashing cleaning agents, water softeners, rinse aids, starches, vinegar cleaners, water deflectors, color catchers, bleaching agents, grayness inhibitors, color transfer inhibitors and biologically active systems and the like.

Cleaning machines can be understood objectively as meaning household machines, such as washing machines, dishwashers, dryers, finishers and the like, but cleaning machines can also be understood as meaning large kitchen appliances or equipment from dry cleaning businesses.

In accordance with the present method for the dosing of cleaning agents in cleaning machines, control information items for example transmitted to a mobile dosing device are in an embodiment control information items concerning the program structure of the cleaning machine executing the cleaning operation, which cleaning machine can be used by the dosing device to be able to determine more accurately an operating state of a cleaning operation in a cleaning machine, whereby a time for the dosing of cleaning agent can also be determined more accurately, so that the best possible cleaning result can be achieved.

In an embodiment, the control information items include the complete program sequence of a cleaning machine in all cleaning programs that can be performed with the cleaning machine. The program sequence is understood as meaning the sequence of all operations that can be executed during a program, which usually are individual for each type of cleaning machine.

A mobile dosing device for executing the present method for example has a communication unit including a communication interface configured to receive the control information item. The communication interface is in an embodiment formed as a wireless communication interface for a flexible, for example also remote, possible reception of the control information item.

The control information items received by the dosing device via the communication unit are for example stored in a memory, such as in an external memory arranged remote from the dosing device. For example, the external storage is cloud-based and can be reached via a connection to the cloud. In an embodiment, the dosing device can receive the control information items directly from the external memory in this way. This allows a cloud-based handling of the stored data and thus, in addition to a simple exchange of information items, also a virtually universal access to the information items.

In addition to receiving the control information items stored in an external memory via a direct connection to the memory, the control information items can also be transmitted indirectly, for example, via an Internet service and can be received by the dosing device.

Alternatively or cumulatively, the memory can also be formed as an internal memory and arranged on the dosing device, for example integrated into the dosing device. Although this does not permit cloud-based access to the data in the case of an alternative arrangement, it also does not require a communication interface formed as a wireless interface.

According to a further embodiment of the present method for the dosing of cleaning agents in cleaning machines, it is proposed that the control information items be transmitted wirelessly instead of directly from the memory, via a user, for example, with the aid of a user terminal, such as a smart phone, a tablet or a computer, to the mobile dosing device and be received by the dosing device.

In this case, the user terminal can for example establish a connection to the dosing device via an application and send the control information items wirelessly to the dosing device.

The user terminal can also be wirelessly connected to the memory to receive the information items subsequently forwarded to the dosing device from the memory or retrieve from the memory.

Since the received control information items according to the present method depend on an information item about a cleaning machine, the memory may first receive corresponding information items about a cleaning machine before selecting the corresponding control information items. The memory according to the present method for example receives this information item via a sensor-based automatic recognition.

The information item about a cleaning machine is a device-specific information item, for example an information item uniquely defining the cleaning machine, such as a serial number.

Alternatively or cumulatively, the information item can also be a product number, type number, model number, service number, rack number and/or the like, with the aid of which the cleaning machine can be uniquely identified.

According to a further possible embodiment, the information item about a cleaning machine can also be an information item composed of one or more device-specific identifiers, which finally uniquely identifies the cleaning machine. For example, the type and/or the brand and/or the construction year and/or the series and/or the holding capacity and/or the loading capacity and/or the energy classification and/or the filling mode of the cleaning machine can be used as device-specific characteristics.

The information item uniquely defining a cleaning machine is obtained according to the present method via a sensor-based automatic recognition.

According to an exemplary embodiment of the present method, it is proposed for this purpose that the sensor-based automatic recognition of the information item about the cleaning machine be carried out based on an RFID technology, such as based on a near field communication. In this case, a user terminal can for example be capable of receiving the information item about a cleaning machine and of transmitting the information item. In an embodiment, the user terminal in this embodiment has an NFC interface, so as to be able to communicate with a cleaning machine also equipped with an NFC interface, in so far as the devices are in the immediate vicinity. Thus, for example, an information item about a cleaning machine, which is stored in a memory arranged in the cleaning machine, is transmitted directly to this when approaching the user terminal equipped with an NFC interface. Subsequently, these information items can finally be forwarded by the user terminal to the memory via for example a wireless interface for determining a control information item. Alternatively, it can also be possible that a control information item is transmitted via an NFC interface so that it no longer has to be determined from the user terminal.

According to a further exemplary embodiment of the present method, it is proposed that the sensor-based automatic recognition of the information item about the cleaning machine in this case be carried out based on a sensor for detecting an image information item, for example based on a sensor for detecting an image. Semiconductor-based image sensors can be used as image sensors, such as CCD or CMOS sensors.

In accordance with a use of a sensor for detecting an image information item, the information item about the cleaning machine according to the present method is for example an image information item, such as an image. In an embodiment, this can be not only an image information item or an image, but also multiple image information items or images, which for example include at least part of a cleaning machine.

According to an exemplary embodiment of the present method, the image information item or the images are for example optically detected by a sensor arranged in a user terminal. The optical sensor can in this case be the sensor of a camera of a smart phone, a tablet or a smart cam and the like, which includes an image information item or an image of for example at least one part of a cleaning machine. In an embodiment, the image information items or the images such as include specific parts for a cleaning machine such a logo and/or brand and/or nameplate and/or the dosage chamber and/or the like, so that the information item about the cleaning machine can be determined based on these information items.

According to a further exemplary embodiment of the present method, it is proposed that the sensor-based automatic recognition includes the determination of image objects within a detected image. For this purpose, an image can be scanned in steps of a particular defined size, wherein a scanning of the image for example is carried out in a horizontal, vertical and diagonal direction and image objects can be determined, for example, according to predetermined contrasts.

A reduction of the particular image objects can for example be carried out in a step which for example follows a step of recognizing image objects, wherein the reduction of the image objects for example is carried out on the basis of their significance for determining the information item about the cleaning machine. In this case, the image objects may for example be reduced so far after an already made selection so that a promising determination of the information item about the cleaning machine is still possible. This not only allows a reduction of storage capacity of the information item to be stored, but also usually a faster information exchange and thus a faster determination of the information item for example uniquely defining a cleaning machine.

For example, according to a further exemplary embodiment of the present method, it is proposed that the sensor-based automatic recognition uses an algorithm for text recognition, wherein a determination of an information item about a cleaning machine for example is carried out based on a recognized text arranged within the detected image information item. This is suitable when the image information items or the images receive an amount of text beyond the minimum. For example, a text recognition would usually not be necessary for a logo, but it would still be necessary for a nameplate of a cleaning machine. In an embodiment, the text recognition in this case can be extended here via comparison with dictionaries or the like, which allows a more reliable recognition of text modules. Also, for example, a separate dictionary or a list of terms can be implemented, which for example contains common manufacturer names, or common manufacturer's specifications.

In order to obtain a significant determination of the information item about the cleaning machine on the basis of image information items or images, it is proposed objectively that the sensor-based automatic recognition also includes an optical processing of the detected image information item, wherein the optical processing for example is carried out before a determination of image objects within the detected image information item.

An optical processing of the detected image information items or of the detected image can include, for example, a conversion of the color values of an image into gray values or a binarization of the image into black-and-white values. Furthermore, an optical processing can also include a transformation of the images, for example, a transformation into digital data, for example, RGB data. Furthermore, as part of an optical processing, a filtering or grouping of image objects can also be carried out based on the brightness or the size.

According to a further exemplary embodiment of the present method, it is proposed that the detected image information items or images can also be processed locally at the user terminal with one or more of the above-mentioned algorithms and compared with a database for example also present at the user terminal, in order to determine the information item for example uniquely defining a cleaning machine. After identifying the information item about the cleaning machine, the control information item can be determined based on this, which control information item is used for subsequent parameterization of the movable dosing device.

In an alternative embodiment of the present method, the recorded image information items are transmitted with the aid of a user terminal via a communication interface in the cloud, where the detected image information items or images are processed with one or more of the above algorithms in the cloud before the information items are finally compared with a database existing in the cloud in order to determine the information item for example uniquely defining a cleaning machine.

According to a further alternative embodiment of the present method, it is proposed that in the case that several different possible results of identification of an information item for example uniquely defining a cleaning machine were determined, the result in the cloud is transmitted back to the user terminal and a user is enabled to select the suitable information item from the list in order to parameterize the movable dosing device after a determination of the control information item.

In the case that no suitable information item can be determined during a processing procedure, the user can for example perform a re-detection of the image information items or the images and repeat the processing procedure until identification of a unique information item about a cleaning machine.

A dosage of cleaning agent being carried out in accordance with the present method is not only dependent on the information item about the cleaning machine or the received control information item determined via this information item, but also based on the determined progress of the cleaning operation.

A determination of the progress of the cleaning operation in this case is for example carried out via the detection of measured values by sensors, which are combined in a sensor unit and arranged on the dosing device. The sensors integrated in the sensor unit of the dosing device can be any of a wide variety of types of sensors, which can for example detect different measured variables, so that a current cleaning state of items to be cleaned can be determined as accurately as possible.

Thus, for example, sensors for detecting measured variables of a cleaning fluid and sensors for measuring geometric, mechanical, dynamic, thermal or caloric measured variables or also sensors for measuring climatic, optical, acoustic, electrical chemical, biological or medical measured variables can be arranged.

The measured values detected and processed by the sensors of the sensor unit are for example forwarded directly to the control unit, where the data is prepared.

The processed and prepared measured values can for example be made available to the user together with relevant data that are additionally accessible via the communication unit for the cleaning operation, in order to transmit advertising, suggestions, warnings or other messages for use or planning of the cleaning operation based thereon and thereby to perform an optimized cleaning.

In this case, an optimized cleaning is understood as meaning an energy-related, cleaning-related, noise-related or otherwise differently optimized cleaning.

In a possible embodiment of the present method, in which the communication unit of the movable dosing device is connected to a cloud via an interface, it is proposed that messages are sent to defined addresses via the communication unit of the mobile dosing device, for example, by SMS, email, Skype or an Internet-based messaging service to inform a user about the progress, cancellation, completion, start, or other status of a cleaning operation.

In an alternative embodiment of the present method, in which the communication unit of the movable dosing device is connected to a web service or an application on a user terminal via an interface and transmits information items about a treatment, cleaning or cleansing operation to this instance, a user can be enabled to cause a further action, cancel or change a running action or perform a configuration of the movable dosing device.

In a typical implementation for processing the measured values detected by the sensor unit, the sensor information items can be collected and prepared for further use, wherein the dosing device then for example has a non-temporary memory to store the sensor information items recorded over time and to automatically make a decision about the suitable time and the addition of suitable different substances and in the absence of appropriate decision criteria or external further influences to implement a pre-defined sequence of addition of substances based on the decision and to perform a cleaning or treatment optimized to the circumstances.

A preparation of the sensor information items can also be used objectively to automatically determine the information item for example uniquely defining a cleaning machine, in which the movable dosing device is for example connected indirectly to a database, a website or a service in a cloud via a wireless connection via a user terminal or directly via an integrated modem and via a data matching between the data prepared by the movable dosing device data and the data stored in the cloud, performs a determination of the information item for example uniquely defining the cleaning machine, so that a cleaning optimized to the circumstances can be performed.

In addition to the determination of an information item for example uniquely defining a cleaning machine based on a preparation of the sensor information items, via a continuous matching of the prepared sensor information items with the information items provided by a database, a website or a service in the cloud, an iterative process related to the individual washing can also be performed for adaptation and decision making of a suitable dosing time.

According to a further embodiment of the present method, a decision of a suitable dosing time can also be made via the inclusion of user experience values in which the user can for example perform a manual parameterization of a cleaning operation via a user terminal.

In accordance with a further embodiment for improving the present method, it is proposed that a user profile is created on the basis of the measured variables detected during a cleaning operation and the received control information items, which profile is for example stored on a nonvolatile memory arranged on the dosing device.

According to a further embodiment of the present method, it is proposed that the dosing device has a completely autonomous, self-learning algorithm, which over time uses both the information items prepared by the dosing device and related to the individual washing operation, and the information items additionally accessible from a memory or stored in a user profile, to learn a decision-making about the appropriate time and the addition of suitable different cleaning substances in order to perform a cleaning optimized to the circumstances relating to energy, cleaning, noise or any other type.

According to a second aspect of the present disclosure, a mobile dosing device is proposed for the automatic dosing of cleaning agents in a cleaning machine, including: at least one dosage chamber; at least one sensor unit configured to detect measured variables; at least one control unit configured to control the mobile dosing device; at least one communication unit configured to receive a control information item, wherein the control information item is dependent on an information item about the cleaning machine that can be determined via a sensor-based automatic recognition; wherein the dosing device is configured such that a dosed supply of cleaning agent is carried out depending on the received control information items and the determined progress of the cleaning operation.

The sensor unit of the mobile dosing device for example includes a number of different sensors which are able to determine particularly accurately a current cleaning state of items to be cleaned during a cleaning operation, so that on this basis, among other things, an optimal dosage of cleaning agent can be made.

For this purpose, the sensor unit may for example have at least one sensor for detecting the state of a cleaning fluid, such as at least one sensor for measuring viscosity, turbidity, pollen load, water hardness, color rinse, pH value or odor.

In addition, in order to ensure the determination of an optimal dosage of cleaning agent, it is proposed that at least one sensor for measuring one of the following measured variables is arranged on the dosing device and/or the cleaning machine: geometric measured variables; mechanical measured variables; dynamic measured variables; thermal and caloric measured variables; climatic measured variables; optical measured variables; acoustic measured variables; electrical measured variables; chemical, biological or medical measured variables.

In addition, an accurate determination of a soiling state of the items to be cleaned is possible when the sensor unit has at least one miniature or microcamera for detecting a state of a items to be cleaned.

The control unit of the present dosing device is for example configured to control the dosing of the dosing device on the basis of the measured values determined by the sensor unit and on the basis of the control information item obtained. In addition, the control unit is also able to make the dosing of cleaning agent dependent on other information items such as user experience values and user profiles and the like, wherein the control unit performs a dosage of cleaning agent, such as after a successful communication with the communication unit.

According to a suitable embodiment, the communication unit of the present dosing device is formed as a wireless communication unit, configured for wireless communication, such as via WLAN, Bluetooth, Zigbee, NFC, Wibree, WiMAX, measurable networks, IrDA or optical directional radio. In an embodiment, the mobile dosing device can thus be in contact with a user, a storage, a cloud-based service and the like, despite its arrangement within a cleaning machine.

In addition to the possibility of wireless communication of the dosing device with a user, a memory, a cloud-based service and the like, the wireless communication unit also offers the possibility of wireless communication of the dosing device with other cleaning machines within a private or public network.

For an optimal dosage, it is proposed objectively that the mobile dosing device for example has a plurality of dosage chambers, which are formed as a structural unit. The dosage chambers can for example be filled via separate refill openings with the desired cleaning agent before a cleaning operation. The refill openings are for example so large that they can be easily filled via these, and a possible rinsing operation can be carried out. The fact that the dosing device can be easily cleaned, one and the same dosage chamber can be filled with various cleaning agents after flushing. This allows a use of a dosing device in different cleaning machines.

In order to ensure optimum dosing, it is also proposed that the mobile dosing device, such as the feed unit of the dosing device, has at least one electrical valve and the associated control electronics. For example, the mobile dosing device has a dosing valve for each dosage chamber. These are electrically controlled valves. Alternatively, the valves can also be pneumatically or magnetically controlled.

It is also proposed that the mobile dosing device has an autonomous energy conversion system for the necessary energy supply. Alternatively, another energy conversion system can be arranged on mobile dosing device, which converts, for example, kinetic energy or heat energy into electrical energy. In addition, it is proposed that alternatively or cumulatively, a mobile power supply unit is arranged on the mobile dosing device for an autonomous energy conversion system, such as in the form of batteries or accumulators, so that the supply of the mobile dosing device with electrical energy is ensured at all times.

Alternatively, the mobile dosing device can also have a device for inductive and non-contact transmission of electrical energy, so that the mobile dosing device can be fed electrically without contact by induction. It is therefore proposed that the mobile dosing device has at least one coil in which a current can be induced via a magnetic and/or electric field.

In order to be able to determine the respective fill levels of the cleaning agents in for example each dosage chamber, it is further proposed that the mobile dosing device for example has a measuring device for measuring a fill level, such as an absolute fill level, in each dosage chamber. In order to obtain a continuous overview about the fill levels of the cleaning agents, the measurement of the fill level can for example be carried out continuously, such as via a mechanical, a capacitive or an optical measurement method. Alternatively, a fill level measurement can also be carried out via a conductivity, ultrasound or microwave method.

In an energy-saving alternative to the continuous measurement of the fill levels, the fill level of the dosage chambers can also only be determined at particular intervals or only above particular limits by employing fill level limit switches.

In order to be able to display the measured fill levels of the cleaning agents or to be able to warn if necessary when low fill levels are reached, it is proposed that the mobile dosing device is suitable for sending a notification about current fill levels.

In addition to current fill levels, the mobile dosing device can for example also forward information items about any errors in a rinsing or washing chamber, such as carbonization of contacts, jamming of valves or discharges of batteries.

According to a further embodiment, a computer program is described which includes program instructions which cause a processor to execute and/or control a present method when the computer program is running on the processor.

In addition, an exemplary computer-readable storage medium is described which contains an exemplary computer program.

There is further described, in accordance with a third aspect, an exemplary system including the mobile dosing device, a user terminal, and a memory, which together are configured to perform an exemplary present method.

The exemplary embodiments of the present disclosure described above are also to be understood as being disclosed in all combinations with one another. For example, exemplary embodiments are to be understood in terms of the different aspects disclosed.

For example, the preceding or following description of method steps according to suitable embodiments of a method also discloses corresponding means for performing the method steps by suitable embodiments of a device. Likewise, by the disclosure of employing a device for performing a method step, the corresponding method step is also disclosed.

Further exemplary embodiments of the present disclosure can be found in the following detailed description of some exemplary embodiments of the present disclosure, for example in conjunction with the figures. However, the figures should only serve the purpose of clarification, not, however, to determine the scope of protection of the present disclosure. The figures are not to scale and are merely intended to exemplify the general concept of the present disclosure. For example, features included in the figures should by no means be considered as a necessary component of the present disclosure.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses of the subject matter as described herein. Furthermore, there is no intention to be bound by any theory presented in the preceding background or the following detailed description.

Figure 1:
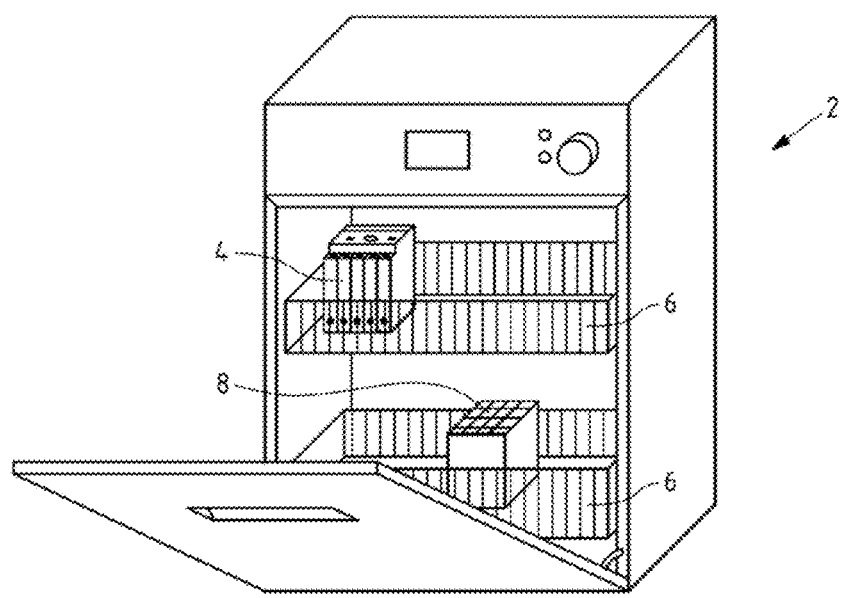
FIG. 1 shows a mobile dosing device for the automatic dosing of cleaning agents, arranged in the treatment space of a dishwasher.

FIG. 1 shows a mobile dosing device 4 for the automatic dosing of cleaning agents according to a first exemplary embodiment, arranged in the treatment space of a dishwasher 2. In the case of an arrangement of the dosing device 4 within a dishwasher 2, the device may for example be designed to be robust against the mechanical and chemical influences acting during the respective cleaning operations. The dosing device 4 arranged in one of the baskets 6 of the dishwasher 2 according to FIG. 1 for example has a built-in autonomous power supply 26 and can alternatively also be arranged in the cutlery basket 8 or in another embodiment also in a cutlery drawer or in or on a storage tank for cleaning agent of the dishwasher 2.

Figure 2:
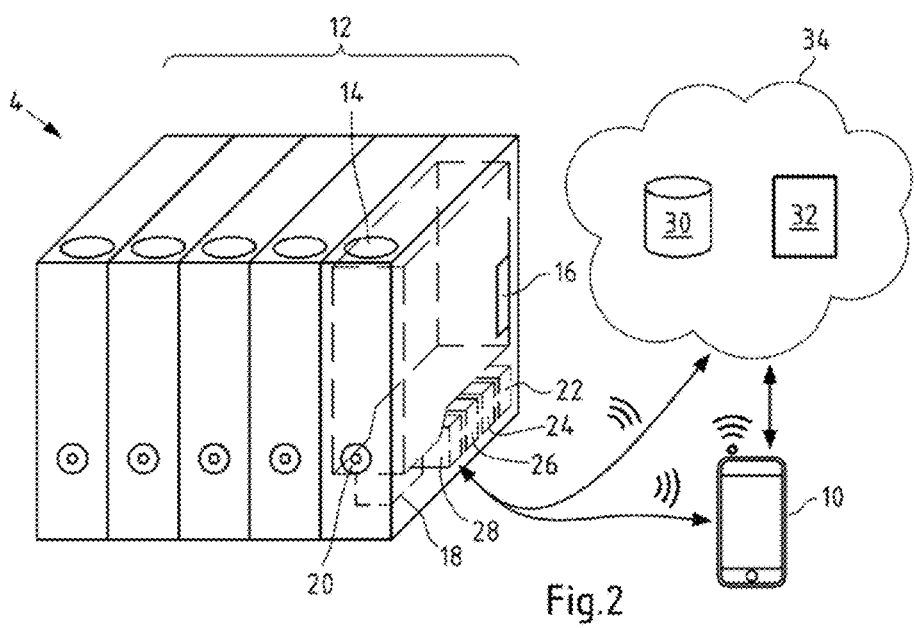
FIG. 2 shows the mobile dosing device of FIG. 1 in an enlarged view.

FIG. 2 shows the mobile dosing device of FIG. 1 in an enlarged view, in which the various dosage chambers 12 are formed in a structural unit. The dosage chambers 12 have their own refill openings 14 and each have their own fill level sensor 16. The interior of each dosage chamber 12 is connected in each case to an electrical valve 20 via a control line 18. It is understood that the dosage chambers 12 may also be equipped with the corresponding control electronics (not explicitly shown here) in order to be able to ensure a corresponding dosage of the cleaning agents. Furthermore, the dosing device 4 is equipped with a communication unit 28 including a communication interface in order to be able to conduct the necessary communication with other components of the dosing device 4, such as the control unit 22, such as regarding the fill levels of the cleaning agents and the receipt of the dosing instructions.

In addition to the possibility of communication with the internal components of the dosing device 4, the dosing device 4 is also capable of communication with a user 40 via an interface of the communication unit 28, which is for example formed as a wireless communication interface. A user 40 can communicate with the dosing device 4, for example, by employing a user terminal 10, for example by employing a computer, tablet or smart phone. A connection can be made, for example, via Bluetooth, WLAN, or via mobile radio. In addition to communication with a user 40, the communication interface, which is for example formed as a wireless interface, also allows a communication of the dosing device 4 with an externally arranged memory 30, which for example can be reached via a connection to a cloud 34. In this case, a communication with the externally arranged memory 30 can be carried out either directly or indirectly via a user terminal 10. In addition to an indirect connection to the cloud 34 via a user terminal 10, a connection to the cloud can also be made indirectly via an Internet service 32.

Alternatively or in combination for storing data on an external memory 30, an internal memory can also be present in the dosing device 4 in which data can be stored. In addition to a communication unit 28 and a control unit 22, the dosing device 4 further has a sensor unit 24 for detecting measured variables and an autonomous power supply 26 in the form of exchangeable batteries or in the form of an autonomous energy conversion system. Alternatively, the dosing device 4 can also be supplied with power via the power supply of the dishwasher 2.

The dosing device 4 according to FIG. 2 has a total of five dosage chambers 12, but it goes without saying that also more or less dosage chambers 12 can be arranged, which also need not be formed in a structural unit. In addition to the dosage of rinsing agent, the dosing device 4 shown is also suitable for an optimized introduction of different substances, such as rinse aid, water softener, dishwasher salt in for example liquid form or dishwasher cleaners and the like. The individual substances are then for example filled into the different dosage chambers 12 of the dosing device 4. If necessary, the respective substance is then introduced into the treatment space by the electrical valve 20 in the respective amount determined by the control unit 22. Each dosage chamber 12 has fill level sensors 16 which measure the state and the available amount of the respective substance and forward these to the control unit 22, which gives an indication to the user 40 for refilling or reordering as needed.

Figure 3A:
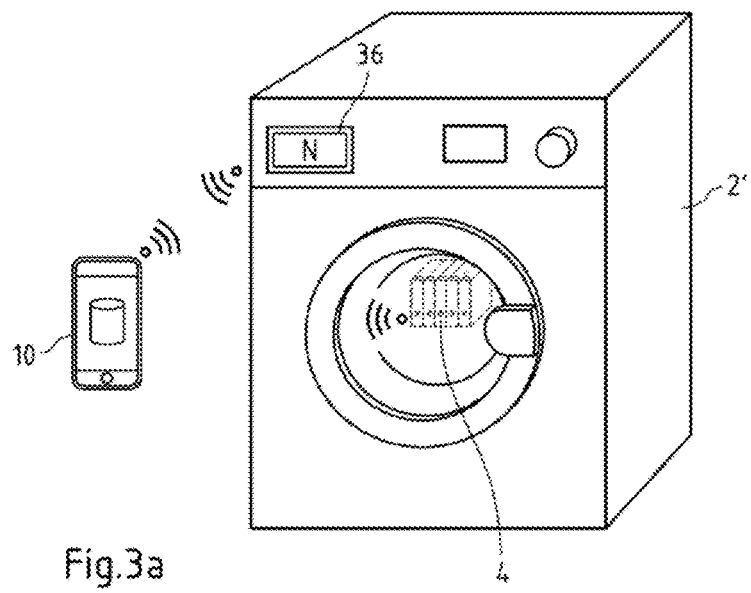
FIG. 3a shows a first embodiment of a mobile dosing device for the automatic dosing of cleaning agents arranged in the washing drum of a washing machine and wirelessly connected to a user terminal for receiving control information items.

FIG. 3a shows a first embodiment of a mobile dosing device for the automatic dosing of cleaning agents arranged in the washing drum of a washing machine 2' and wirelessly connected to a user terminal 10 for receiving control information items. According to the embodiment shown in FIG. 3a, both the user terminal 10 formed as a smart phone and the cleaning machine formed as a washing machine 2' have an NFC interface, so that the two devices equipped with an NFC interface are capable of a contactless exchange of data if they are found in the immediate vicinity. According to the embodiment shown in FIG. 3a, the information item or the control information items of the machine, which for example uniquely defines a cleaning machine, itself stored in a memory arranged in the washing machine 2' which are transmitted to the user terminal 10 at an approach of the user terminal 10 equipped with an NFC interface.

The user terminal 10 can access a database via an application, for example, for matching the data of the cleaning machine or for retrieving the corresponding control information item, before the information items are finally forwarded from the user terminal 10 via a wireless interface, for example, via WLAN, Zigbee or Bluetooth, to the movable dosing device 4.

Figure 3B:
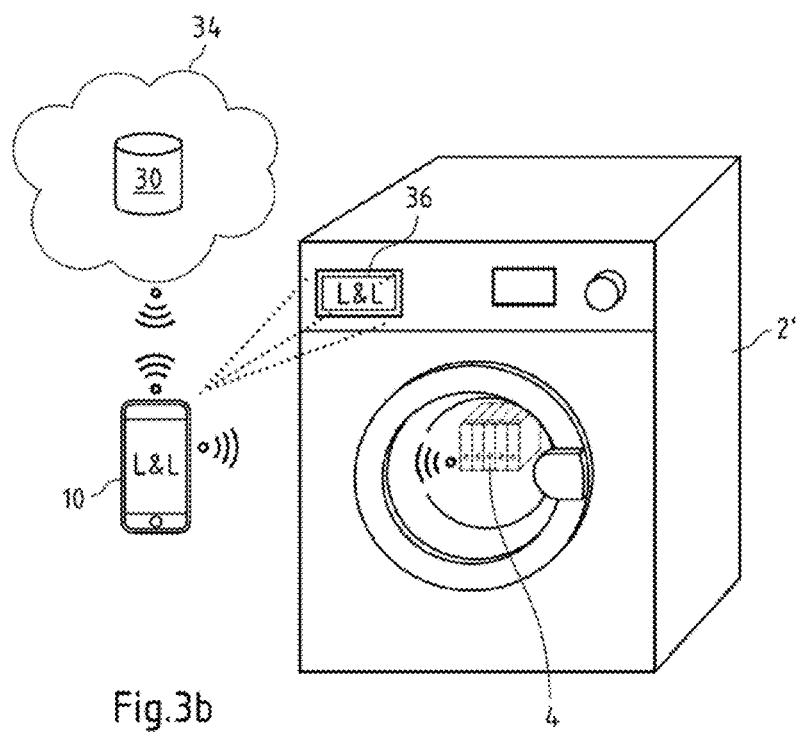
FIG. 3b shows a second embodiment of a mobile dosing device for the automatic dosing of cleaning agents arranged in the washing drum of a washing machine and wirelessly connected to a user terminal for receiving control information items.

FIG. 3b shows a second embodiment of a mobile dosing device 4 for the automatic dosing of cleaning agents arranged in the washing drum of a washing machine 2' and wirelessly connected to a user terminal for receiving control information items. According to the embodiment shown in FIG. 3b, the user terminal 10 formed as a smart phone has one or more imaging sensors with which it can detect an image information item, for example an image of the corresponding cleaning machine. In the embodiment illustrated in FIG. 3b, a user 40, for example, via his user terminal 10, detects one or more images of the logo and other textual information items arranged on the surface of the cleaning machine. Via a for example wireless connection to a cloud 34, the user 40 with his user terminal 10 can also access a memory 30 in which, for example, for different serial numbers of cleaning machines, both corresponding image information items and the respective control information items are stored, so that on the basis of the detected image information items of the cleaning machine, an information item for example uniquely defining the cleaning machine can be determined, on the basis of which a determination of the control information item can be carried out. This selection can be carried out either with the aid of a program that can be reached via the cloud 34 or with the aid of a service 32 that can be reached via the cloud 34, or via an application stored on the user terminal 10. The required control information item is produced via the assignment of a control information item to the information item about a cleaning machine, which control information item is also located in the memory 30 and is for example transmitted via the user terminal 10 to the dosing device 10.

Figure 3C:
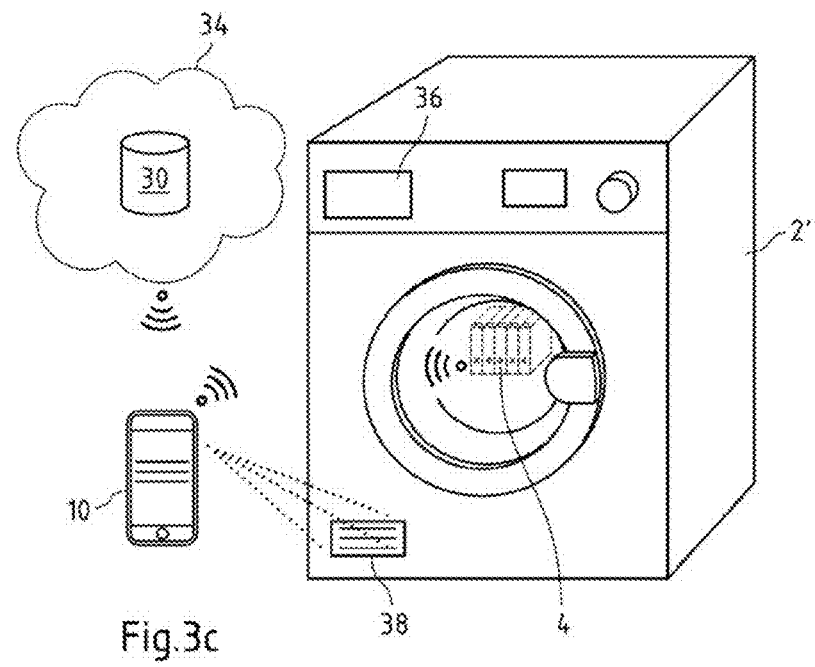
FIG. 3c shows a third embodiment of a mobile dosing device for the automatic dosing of cleaning agents arranged in the washing drum of a washing machine and wirelessly connected to a user terminal for receiving control information items.

FIG. 3c shows a third embodiment of a mobile dosing device for the automatic dosing of cleaning agents arranged in the washing drum of a washing machine and wirelessly connected to a user terminal for receiving control information items, in which instead of one or more images of the logo and other textual information items arranged on the surface of the cleaning machine, one or more images of the nameplate of the cleaning machine are detected, so that as similarly described in FIG. 3b, based on the detected image information items, an information item for example uniquely defining the cleaning machine and the determination of the corresponding control information item therefrom can be carried out before the control information item for example is transmitted via the user terminal 10 to the dosing device 10.

Since a nameplate of a cleaning machine usually includes much more text than a logo of a cleaning machine, it is proposed according to the embodiment shown in FIG. 3c that the images are first converted into a digital form for evaluation by employing a text recognition algorithm.

Figure 3D:
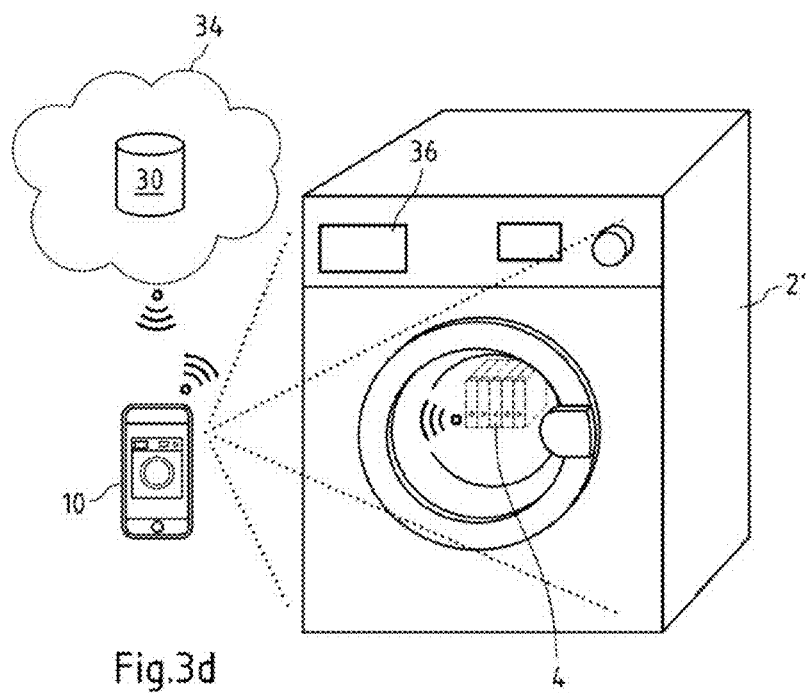
FIG. 3d shows a fourth embodiment of a mobile dosing device for the automatic dosing of cleaning agents arranged in the washing drum of a washing machine and wirelessly connected to a user terminal for receiving control information items.

FIG. 3d shows a fourth embodiment of a mobile dosing device for the automatic dosing of cleaning agents arranged in the washing drum of a washing machine and wirelessly connected to a user terminal for receiving control information items, in which instead of one or more images of the logo and other textual information items arranged on the surface of the treatment device, one or more images of the frontal view of a cleaning machine are detected, so that as similarly described in FIGS. 3b and 3c, based on the detected image information items, an information item about a cleaning machine and a control information item therefrom can be determined before the control information item is transmitted to the dosing device 10 for example via the user terminal 10.

Figure 4A:
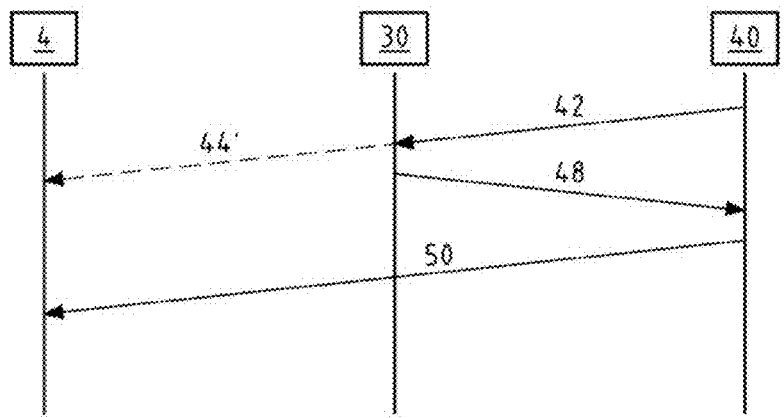
FIG. 4a shows a flow chart illustrating an exemplary operation for receiving control information items according to a first embodiment.

FIG. 4a shows a flowchart for illustrating an exemplary operation for receiving control information items according to a first embodiment, in which a user 40 first sends via a user interface an image information item detected with the aid of a user terminal 10 to a memory 30 in which this image information item is first stored. After an optional authentication of the user 40, which is for example integrated into the request 42, the image information item is evaluated by a program or by a service 32, wherein during the evaluation, on the basis of the detected image information item, an information item about a cleaning machine is determined, which is assigned to a corresponding control information item. Alternatively, the evaluation can also be carried out via an application of the user terminal 10, which only needs to access the data stored in the memory 30 for this purpose.

After determining the control information item on the basis of the image information item detected with the aid of a user terminal 10, the determined control information item can now either be sent directly wirelessly to the mobile dosing device 4 in an optional step 44' or first sent to the user 40 via the mobile user terminal 10 in step 48, which then finally forwards the control information item to the mobile dosing device in step 50.

Figure 4B:
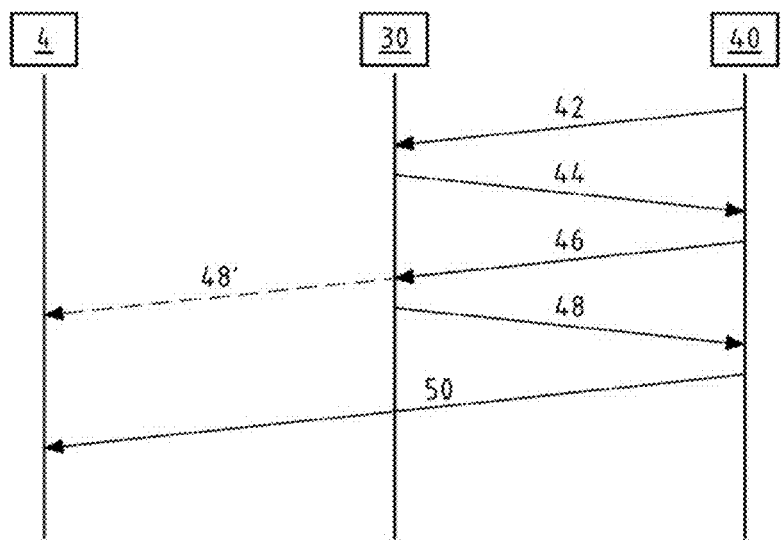
FIG. 4b shows a flow chart illustrating an exemplary operation for receiving control information items according to a second embodiment.

FIG. 4b shows a flow chart for illustrating an exemplary operation for receiving control information items according to a further embodiment, in which no unique control information item can be determined by a program or service 32 after transmission of an image information item detected with the aid of a user terminal 10 to a memory 30. One reason for this can be, for example, that the image information item detected by the user terminal 10 is not unique, so that this image information item does not lead to the identification of a single control information item.

In such a case, for example, several information items uniquely defining a cleaning machine come into consideration with corresponding control information items that match the detected image information item, so that according to the embodiment shown in FIG. 4b in step 44, a request is first made to the user to select various information items about the cleaning machine matching in terms of the detected image information item, from which the user 40 then for example selects the matching information item and sends this information item to the storage unit in step 46.

Finally, the control information item associated with the selected information item about a cleaning machine is either sent directly from the memory 30 in step 48' or indirectly in steps 48 and 50 by employing the user terminal.

As an alternative to the operation proposed here, universal control information items can also be stored in the memory 30, which are transmitted in the case in which a corresponding information item about a cleaning machine can not be identified uniquely on the basis of a detected image information item.

In addition, not necessarily for each information item about a cleaning machine, specific control information items may be stored in the memory 30, the same control information items can also be stored for different types.

Figure 5:
FIG. 5 shows an example of a table for selecting a cleaning machine transmitted to a user terminal in accordance with FIG. 4b in step 44.
Figure 5:
Figure 5:
Figure 5:
Figure 5:
Figure 5:

FIG. 5 shows an example of a request transmitted to a user terminal according to FIG. 4b in step 44 in the form of a table for selecting by a user the corresponding information item about a cleaning machine. In the table transferred from the memory 30 to the user 40, in addition to an information item about a cleaning machine formed here as a serial number, corresponding control information items and a manufacturer specification and a frontal view of the corresponding cleaning machine are listed, which may allow a user to uniquely select the information items about his cleaning machine and the corresponding control information items.

Figure 6:
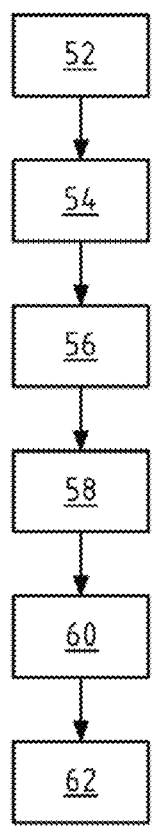
FIG. 6 shows a flow chart illustrating an example sequence of a sensor-based automatic recognition, from the detection of an image information item to the selection of a control information item.

FIG. 6 shows a flow chart illustrating an example sequence of a sensor-based automatic recognition, from the detection of an image information item to the selection of a control information item.

The detection of an image information item performed in step 52 for example is carried out in this case with the aid of a user terminal 10, such as a smart phone, a tablet, a smart watch, a smart cam, a computer or the like, wherein the image information item can include one or more images of at least a part of a cleaning machine.

In a step 54, following the detection of the image information item, an optical processing of the detected image information item can be carried out, in which, for example, the color values of an image are converted to gray values or a binarization of the image is carried out in black-and-white values. Alternatively, the images can also be transformed into digital data, for example RGB data. Furthermore, as part of an optical processing, a filtering or grouping of image objects can also be carried out based on the brightness or the size.

After an optional processing of the image information item, a reduction of the image objects is carried out in step 56, in which for example only image objects are selected from the existing image objects that could be relevant for later identification of an information item about a cleaning machine.

In step 58, a comparison is subsequently carried out with image information items stored in a memory 30. In this case, a detailed collection of data relating to various cleaning machines is stored in the memory 30, in which, for example, various images, gray scale images, black-and-white images, RGB data sets and the like are stored for individual types of cleaning machines by employing which comparisons with the detected image information items can be performed.

Finally, in step 60, a probability distribution may be created on the basis of the matching features, which leads, starting from a certain defined probability, to a unique assignment of the detected image information item to a specific type of cleaning machine. If this minimum probability of matching characteristics is not reached, then in the selection finally to be made in step 62 based on information items about a cleaning machine, not only is a possible control information item selected, but for example a table according to FIG. 5 is transmitted to the user 40, so that he can make a final selection on his type of cleaning machine and the control information items related to this via the specifications listed in the table.

The embodiments of the present disclosure described in this specification and the respective optional features and properties cited in this context should also be understood as disclosing all combinations with one another. Such as, the description of a feature encompassed by an embodiment is, unless explicitly explained to the contrary, not to be understood in this case as meaning that the feature is necessary or essential for the function of the embodiment. The sequence of the method steps described in this specification in the individual flowcharts is not mandatory, alternative sequences of the method steps are conceivable. The method steps can be implemented in various ways, so an implementation in software (by program instructions), hardware, or a combination of both to implement the method steps is conceivable.

Terms used in the patent claims, such as "comprising", "having", "including", "containing" and the like, do not exclude further elements or steps. The expression "at least partially" includes both the "partial" and "full" cases. The expression "and/or" should be understood as meaning that both the alternative and the combination should be disclosed, that is, "A and/or B" means "(A) or (B) or (A and B)". The use of the indefinite article does not exclude a plurality. A single device can perform the functions of several units or devices mentioned in the patent claims. Reference signs indicated in the patent claims should not be regarded as limitations on the means and steps employed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A method for a dosing of a cleaning agent in a cleaning machine comprising:
    detecting an information item about the cleaning machine, wherein the information item includes an energy classification of the cleaning machine and at least one of a product number, a type number, a model number, a service number, and a serial number;
    determining a control information item in response to the information item;
    receiving, by a dosing device, the control information item concerning a program structure of the cleaning machine, wherein the control information item is dependent on the information item about the cleaning machine;
    detecting, by a sensor, a measured variable of a cleaning fluid;
    determining a progress of a cleaning operation in response to the measured variable and the program structure of the cleaning machine;
    detecting a soiling state of an item to be cleaned within the cleaning machine;
    detecting a hardness of the cleaning fluid;
    dosing of the cleaning agent depending on the energy classification of the cleaning machine, the hardness of the cleaning fluid, the soiling state of the item to be cleaned, and the progress of the cleaning operation; and
    wherein the information item about the cleaning machine is determined via an image captured by a camera.

2. The method according to claim 1, wherein the information item about the cleaning machine is determined based on a detecting a serial number of the cleaning machine via the image captured by the camera.

3. The method according to claim 1, wherein the determination of the information item about the cleaning machine comprises a detection of at least a part of the cleaning machine, wherein the information item is optically detected by the camera arranged in a user terminal.

4. The method according to claim 1, wherein the information item about the cleaning machine is determined in response to an image object determined according to a predetermined contrast.

5. The method according to claim 1, wherein the information item about the cleaning machine is determined using an algorithm for text recognition, wherein determination of the information item about the cleaning machine is carried out on the basis of a recognized text arranged within the information item.

6. The method according to claim 1, performing an optical processing of the information item, wherein the optical processing is carried out before a determination of an image object within the information item.

7. The method according to claim 1, wherein the control information item is stored in a memory, remote from the dosing device, from where the control information item are transmitted directly from the memory to the dosing device.

8. The method according to claim 1, whereinafter receiving the control information item, a matching of real determined data with data stored in a memory is carried out for the control information item.

9. The method according to claim 1, wherein a user profile is created based on measured values detected during the cleaning operation and the received control information items, which user profile is stored on a nonvolatile memory arranged on the dosing device.

10. The method according to claim 1, wherein the measured variable detected during the cleaning operation and received control information items are analyzed and extended with the aid of a machine learning system and wherein the measured variable includes a soiling state of the item to be cleaned.

* * * * *